UNITED STATES PATENT OFFICE.

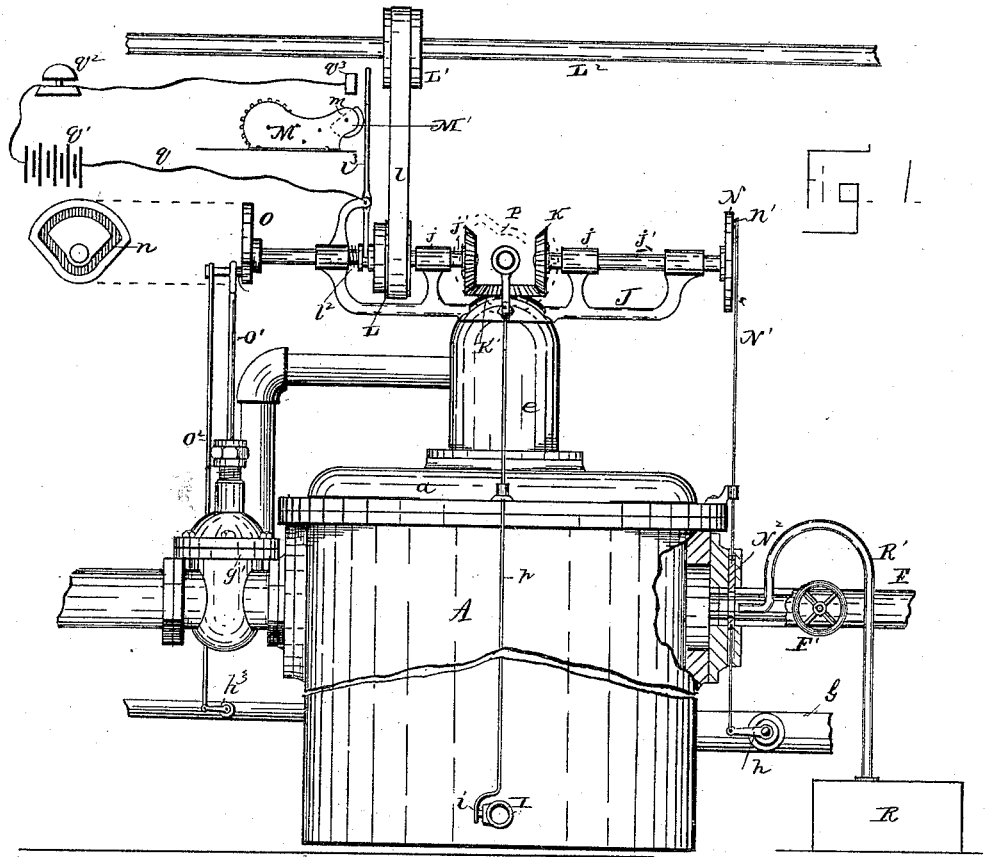

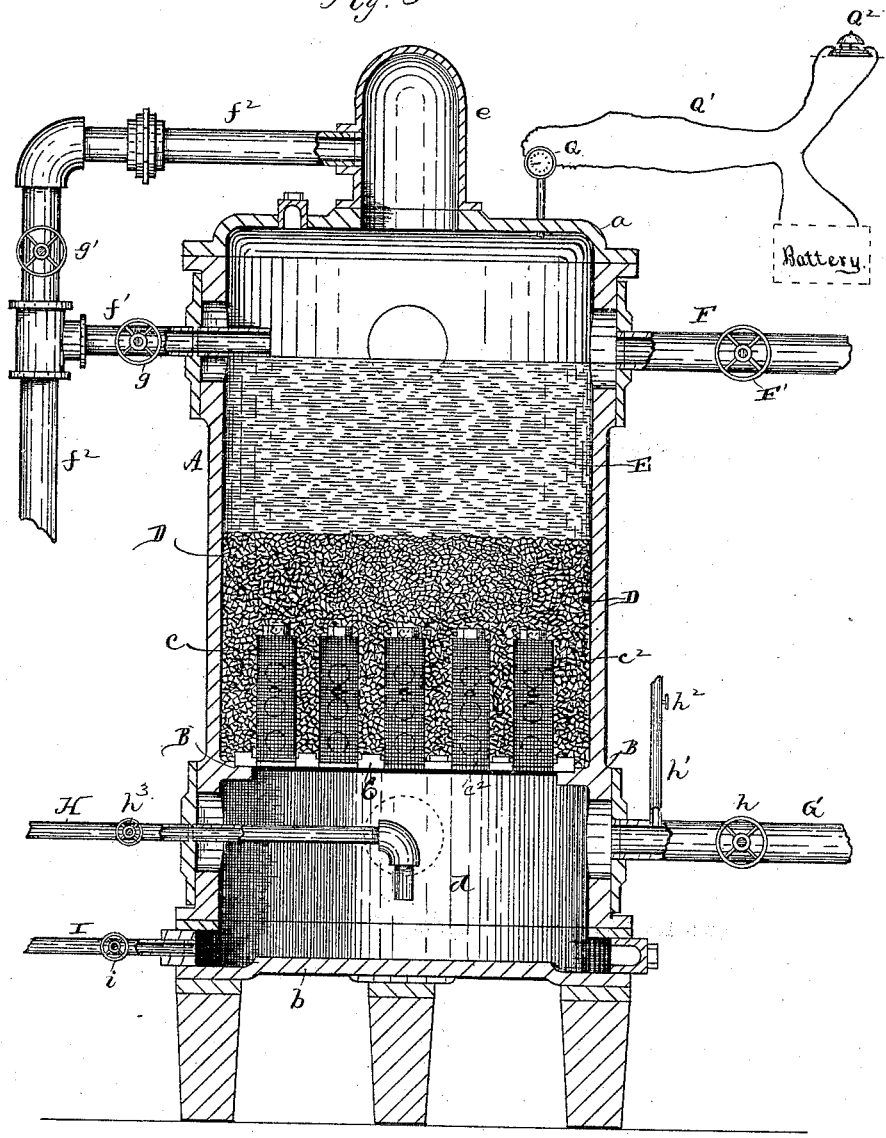

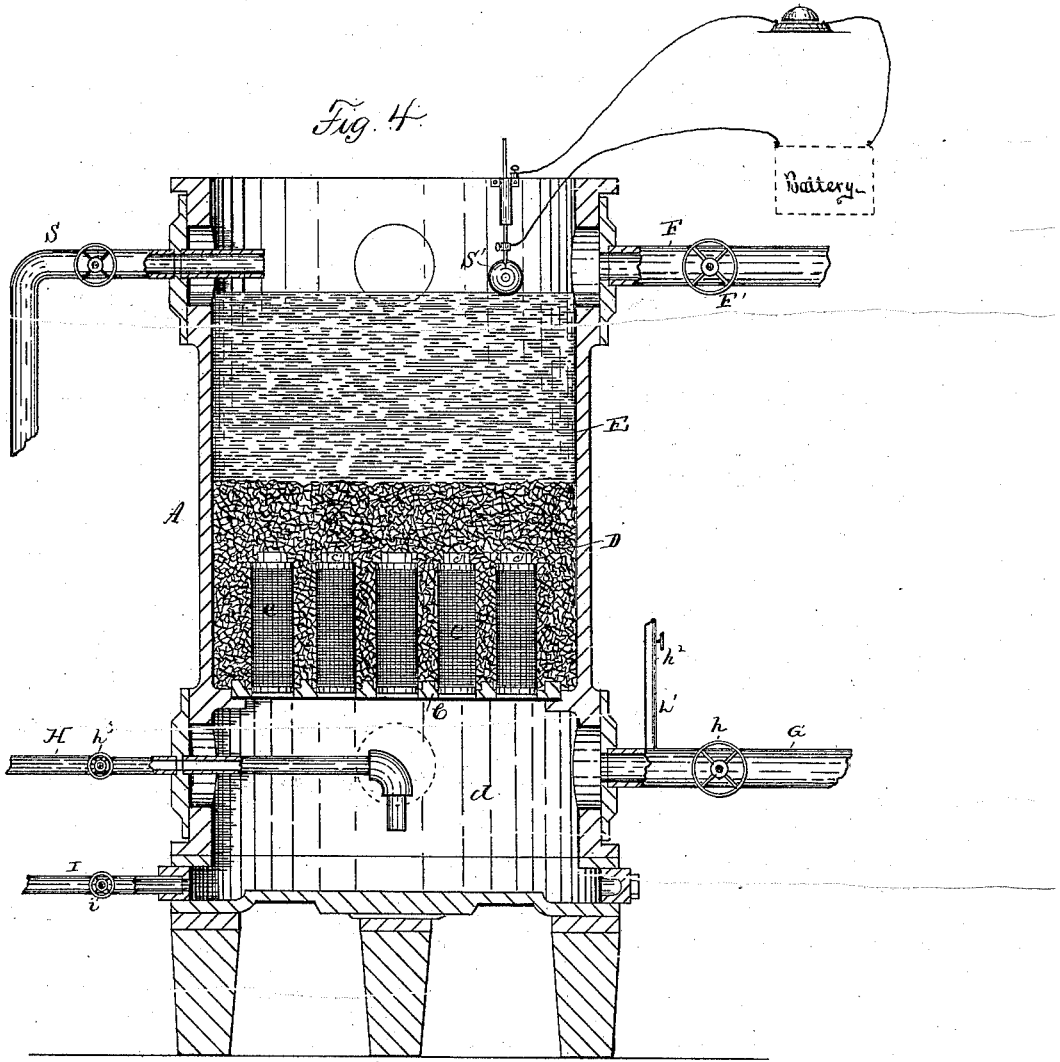

GEORGE H. MOORE, OF NORWICH, CONNECTICUT.

FILTERING APPARATUS.

SPECIFICATION forming part of Letters Patent No. 329,064, dated October 27, 1885.

Application filed November 25, 1884. Serial No. 148,831. (No model.)

*To all whom it may concern:*

Be it known that I, GEORGE H. MOORE, of Norwich, in the county of New London and State of Connecticut, have invented certain new and useful Improvements in Filtering Apparatus; and I do hereby declare the following to be a full, clear, and exact description of the invention, such as will enable others skilled in the art to which it appertains to make and use the same.

My invention relates to an improvement in filtering apparatus.

The object of the invention is to provide a filtering apparatus of such construction that impure water may be thoroughly filtered therein and the filtering medium readily cleansed of all foreign and impure matter or sediment that has been separated from the water and arrested by the filtering medium. A further object is to provide a filtering apparatus of such construction and arrangement of parts that the filtering medium may be agitated and subjected to the washing and cleansing action of an electric fluid and the sediment and impurities separated and removed therefrom. A further object is to provide a filtering apparatus of such construction that the filtering medium may be agitated and subjected to the washing and cleansing action of an electric fluid and the sediment and impurities separated and removed therefrom by floating them from the surface of the filtering medium. A further object of my invention is to provide a filtering apparatus and accessories of such construction that it will be automatically cleansed at certain desired intervals of time. A further object is to automatically operate the water-supply inlet and filtered-water-discharge outlet and open the sediment-discharge outlet and steam-inlet, and also the water-inlet for raising and floating the sediment. A further object is to provide a filtering apparatus with an electric signal for automatically indicating the condition of the filter.

With these ends in view my invention consists in the parts and combination of parts, as will be more fully described, and pointed out in the claims.

In the accompanying drawings, Figure 1 is a view, partly in side elevation and partly in section, of one form of filtering apparatus embodying my invention. Fig. 2 is a plan view of the same. Fig. 3 is a vertical section of the apparatus, the devices for automatically operating the valves not being shown; and Fig. 4 is a modification.

A represents the casing or cylinder having flanged ends, to which are secured the upper and lower heads, $a$ $b$. The interior of the casing is provided with an inwardly-projecting flange or seat, B, on which is removably supported the partition or false bottom C, which latter is provided with a series of perforated stand-pipes, $c$, which are screwed into screw-threaded perforations in the partition. The upper ends of the stand-pipes are closed and are formed with square or angular projections $c'$, for the attachment of a wrench in securing the pipes in place or removing them for repairs or renewal. Each stand-pipe is encircled by a cylindrical cover, $c^2$, of wire-gauze, the latter being securely soldered or otherwise secured to the perforated pipe.

The stand-pipes and inclosing-covers may be cylindrical in form, as shown, or they may be conical or of any other desired form.

D represents the filtering material, which consists preferably of crushed quartz, although other kinds of granular filtering material may be substituted therefor. The filtering material is supported on the false bottom C, and is in direct contact with the wire guards encircling the perforated stand-pipes. That portion of the casing above the false bottom or partition is only partly filled with filtering material, so that a chamber, E, is provided in the upper portion of the casing or receptacle for unfiltered water, while the space below the filtering material constitutes a chamber, $d$, for the filtered water.

As the apparatus represented in Figs. 1, 2, and 3 is intended for filtering-liquid under pressure, its upper head is provided with a dome, $e$, which is either bolted to the head or cast integral therewith.

F represents a pipe, through which the unfiltered water is supplied to the filter. This pipe communicates with the casing near its upper end, and is provided with a valve, F', for opening or closing the passage in the pipe. A discharge-pipe, $f'$, communicates with the upper portion of the casing, and connects with a discharge-pipe, $f^2$, which communicates with the dome $e$. Pipe $f'$ is furnished with a valve, $g$, and pipe $f^2$ with a valve, $g'$. Near the lower end of the cylinder or casing is located the filtered-water-discharge pipe G, which communicates with the chamber $d$ a sufficient distance above its bottom to insure the retention of a body of water within said chamber, for a purpose hereinafter described. Discharge-pipe G is provided with a valve, $h$. An air-pipe, $h'$, communicates with the pipe G, and is provided with a valve, $h^2$. Steam-pipe H, provided with a valve, $h^3$, communicates with the chamber $d$. This pipe may terminate within the chamber in perforated branch pipes or a perforated cylinder or chamber, its function being to distribute steam to the body of water contained therein. At the lower end of the chamber $d$ is a pipe, I, provided with a valve, $i$. This pipe supplies water to the chamber for discharging the sediment or foreign matter, as will be hereinafter explained. Upon the dome is secured the yoke J, provided with bearings $j$, in which are supported the shafts $j'$, to the inner ends of which are secured bevel-gears K, that mesh with a common bevel-gear, K', journaled on a stud or post cast on the yoke. On one of the shafts is loosely mounted the pulley L, to which power is transmitted from the driving-pulley L' on the driving-shaft L² by means of the belt $l$. A friction-clutch is mounted on the same shaft as the pulley, and is forced in contact with the pulley by the spring $l^2$, and out of contact therewith by the clutch-lever, $l^3$, which latter is operated by clock-work, if desired.

M represents a suitable clock-work provided with a cam, M', the periphery of which engages the end of the clutch-lever. When the cut-away portion $m$ of the cam is brought adjacent to the lever, the latter is allowed to recede, thereby enabling the spring $l^2$ to move the clutch into engagement with the belt-pulley and rotate the shaft, and through the central bevel-gear to revolve the series of shafts. On one of the said shafts is secured a plate, N, provided with a cam-groove, $n$, in which engages a stud or anti-friction roller, $n'$, on the upper end of a rod, N', to which is connected a slide-valve, N², for opening or closing the passage in the pipe F, and also a valve, $h$, for opening and closing the passage in the discharge-pipe G. By turning this cam-plate both of said valves are operated simultaneously. On another one of the shafts is secured a disk or plate, O, provided with a cam-groove, in which engages a rod, O', which connects with the valve $g'$ in the sediment-discharge pipe $f^2$, and through the rod O², with the valve $h^3$ governing the supply of steam; hence it will be observed that valves $g'$ and $h^3$ are opened and closed simultaneously. On another one of the shafts is a cam, P, (shown in dotted lines, Fig. 1,) by which the rod $p$ is operated for opening and closing a valve, $i$, in the pipe I. The clutch-lever is electrically connected by the wire $q$, including a suitable battery, $q'$, with a signal-bell, $q^2$, located in an office or other room, the opposite end of the wire being connected with the contact point or plate $q^3$. At certain intervals of time the contact will be made between the clutch-lever and contact-point $q^3$, and closing the circuit and sounding the signal, thereby indicating the fact that the filter is in operation, and that it is then being cleansed.

In pressure-filters the pressure-indicator Q may be included in an electric circuit, Q', and when a certain pressure is recorded sound the signal-bell Q².

An ozone-generator, R, is supplied with air by any suitable fan, the air being treated and ozonized, being conducted through the pipe R' and commingled with the liquid entering the filter, although it may be commingled with the liquid after it has passed through the filter. The preferable plan is to force the ozonized air in direct and intimate contact with the unfiltered water, and thereby destroy germs contained in the water and decolorize and bleach the water.

Having described one form of filtering apparatus embodying my invention, I will briefly describe its operation. Assuming that the valves are all closed, the valves F', $h$, and $h^2$ are first opened. By opening the valve $h^2$ the air contained in the receptacle or casing is allowed to escape, thereby permitting of the free descent of the unfiltered water which enters the apparatus through the pipe F, and flows onto the body of filtering material and percolates through the same, having all foreign matter and impurities separated therefrom and arrested by the filtering material. The arrangement of the series of perforated stand-pipes on the false bottom causes the body of unfiltered water to percolate through the body of filtering material in a uniform manner, so that the entire mass is subjected to a filtering action, and thus prevents the formation of passages, through which an undue proportion of the water might flow and escape in a partially-filtered condition, which would result if but a single stand-pipe were employed. Further, by employing a series of perforated stand-pipes equally distributed over the false bottom there is presented a large area of exit-openings for the escape of the water, and hence the capacity of the filter is much enhanced, as a large body of water is allowed to flow through the filtering material in a comparatively short time. These perforated stand-pipes also have an important function in the cleansing of the filtering material, as will hereinafter be explained. The water after having passed through the body of filtering material and through the perforated stand-pipes flows into the chamber at the lower portion of the apparatus, filtering the same, and flowing therefrom through the discharge-pipe G to any desired point for use. After the apparatus has been in operation for a time, the filtering material will become clogged or obstructed by the foreign matter or sediment that has been separated from the water in its passage through the same, and has been deposited upon the filtering material or become lodged in the interstices between its particles, and hence the material must be cleansed or freed from such foreign matter to insure the continued operation of the apparatus. To cleanse the filtering material, the valves in the pipes F and G are closed and the valves $g$ and $g'$ are opened to allow the water above the body of filtering material to escape to a level with pipe $f'$, so that the chamber in the upper portion of the apparatus shall be only partly filled with water. The surplus water having been drawn off, the valve $g$ is closed, and steam is then admitted below the filtering material. It is not essential that the steam shall be admitted through a pipe entering directly into the chamber below the filtering material, as it may be admitted above said chamber and flow downwardly into the same, or it may be admitted into the body of the filtering material, or it may be admitted into and throughout the body of filtering material, and also into the chamber below the same. As the steam enters the apparatus it operates to gradually heat the body of water below the filtering material, causing it to rise in bubbles, which ascend through the interstices between the grains or particles of the filtering material and displace the colder water above the same, thereby forming continuous reverse ascending and descending currents through the body of the filtering material, which operate to agitate and impart motion to the unconfined particles or grains of the filtering material, and cause them to rub one against another, and by their frictional contact and change of position to separate and disconnect the sediment or foreign matter deposited thereon or lodged in the mass, and cause it to be carried upwardly by the ascending currents of heated water into the body of water in the chamber above the filtering material, where such foreign matter will be held in suspension. The series of perforated stand-pipes, evenly distributed throughout the body of the filtering material, and through which the ascending and descending currents of water are caused to flow, serve to subdivide the currents into a great number of fine jets or streams that are evenly distributed throughout the body of the filtering material, and hence insures an equable and effective agitation and cleansing of the entire body of filtering material. After the sediment or foreign matter has been separated from the filtering material and carried upwardly into the body of water in the upper portion of the apparatus, the steam is cut off and the valve $i$ in the pipe I is opened, and cold or comparatively cold water is allowed to flow into the chamber $d$ and displace an equal amount of heated water in the apparatus, which rises and lifts the body of water situated above the filtering material, and discharges it through the pipe $f^2$, communicating with the dome, thus operating to float and discharge the sediment and foreign matter that has been separated and removed from the filtering material. After the sediment or foreign matter has been removed, the valve $i$ is closed, thereby cutting off the supply of water from the chamber $d$, and valve $g$ is closed, while the valves F' and $h$ are opened and the filtering process is continued.

In Fig. 1 I have represented devices for automatically actuating the valves for cleansing the filtering material at stated intervals of time. The devices can be arranged to operate automatically at any desired intervals of time, and will be regulated according to the character of the liquid being operated upon. Assume that it is desired to cleanse the filtering material once every two hours, the clock-work M is regulated so that the cut-away portion of the cam will come in line with the clutch-lever once in every two hours, and hence cause the clutch to be automatically shifted, and the valves operated by power transmitted from a preferably continuously-revolving shaft through the counter-shafts and bevel-gearing. When the clutch-lever is automatically shifted, it operates to lock the clutch to the belt-pulley, causing the latter to rotate the shafts and automatically and simultaneously close the valves F' and $h$ and open the valves $g$, $g'$, and $h^3$. These valves are retained in the positions specified for any predetermined length of time, which is regulated by the shape imparted to the periphery of the cam operated by the clock-work, sufficient time being allowed to insure a thorough cleansing of the filtering material. The valve $h^3$ is then closed and the valve $i$ opened, admitting water into the lower chamber for the purpose of floating and discharging the sediment or foreign matter through the discharge-pipe $f^2$. Then the valves $i$ and $g$ are closed and valves F' and $h$ opened, and another supply of unfiltered water is admitted, and the operation of filtering continued for another period of two hours, when the filtering material is again automatically cleansed as before. The electric signal operates to automatically sound an alarm in the office, or at any desired point, every time the valves are shifted for cleansing the filtering material, and thus indicate the condition of the filter. Ozonized air is commingled with the water, preferably before it passes through the filtering material, and, by reason of its intimate contact with the water, serves to destroy the germs contained therein and purify it, and to decolorize and bleach the water, or, in other words, to oxidize any oxidizable matter that may be contained in the liquid operated upon which may be other than water.

In Fig. 4 I have represented a modified construction of filtering apparatus, to serve as a low-pressure filter, and hence it is constructed without an upper head. It is operated the same as the high-pressure filter hereinbefore described, with the exception that the sediment is discharged through pipes S. This filter is provided with an electric-alarm signal, which is operated by a float, S'. When the filtering material becomes clogged with foreign matter, so as to unduly obstruct the flow or passage of the liquid through the same, the water will rise and lift the float and close the electric circuit and sound the signal, giving notice of the necessity for cleansing the filter.

While I have mentioned water as being operated upon in the filter, it is evident that my improved apparatus is adapted for operating upon other liquids than water. Other arrangements of parts for automatically opening and closing the valves might be resorted to. Instead of transmitting power from a revolving shaft for automatically operating the valves, they may be operated by electro-magnets, the electric current being governed by any suitable clock-work.

As it is evident that many other changes might be made in the construction and relative arrangement of the parts without departing from the spirit of my invention, I would have it understood that I do not restrict myself to the particular construction and arrangement of parts shown and described.

Having fully described my invention, what I claim as new, and desire to secure by Letters Patent, is—

1. A filtering apparatus consisting of a receptacle or casing provided with a partition or false bottom for supporting the filtering material in a condition to be agitated while being cleansed, and forming an inclosed chamber below the filtering material, a water-supply pipe, and a sediment discharge pipe communicating with the interior of the receptacle above the filtering material, a water-inlet, and a filtered-water-discharge pipe communicating with the chamber below the filtering material, and a steam pipe or conduit for discharging steam into the filter-receptacle and heating the water therein and agitating the filtering material, substantially as set forth.

2. In a filtering apparatus, a receptacle or casing provided with a partition or false bottom, subdividing the receptacle into an upper and lower chamber, a series of perforated stand-pipes mounted on the upper side of the false bottom and extending through and forming the only passages through the same, and filtering material placed around the perforated stand-pipes, in combination with a water-supply pipe and a sediment-discharge pipe communicating with the filter-receptacle above the false bottom, and a water-inlet and filtered-water-discharge pipe communicating with the chamber below the filtering material, substantially as set forth.

3. In a filtering apparatus, the combination, with the filtering-receptacle, water inlet and outlet pipes connecting therewith, valves for opening and closing the water inlet and outlet pipes, and gearing, substantially as described, connected with a driving-shaft for actuating said valve, of means for throwing the valve-actuating gearing into and out of connection with the driving-shaft and opening and closing said valves at any desired predetermined intervals of time, substantially as set forth.

4. In a filtering apparatus, the combination, with the filtering-receptacle, separate valves for governing the water-supply inlet, filtered-water-discharge outlet, sediment-discharge outlet, steam-inlet, and water-inlet, the latter for admitting water for cleansing the filtering medium, and gearing, substantially as described, connected with a driving-shaft for actuating said valves, of means for throwing the valve-actuating gearing into and out of connection with the driving-shaft and opening and closing all of said valves at any desired predetermined intervals of time, substantially as set forth.

5. In a filtering apparatus, the combination, with a pressure-gage connected with the filtering-receptacle, of an electric alarm, substantially as set forth.

6. In a filtering apparatus, the combination, with the mechanism for automatically actuating the valves for cleansing the filtering material at any predetermined intervals of time, substantially as described, of an electric alarm, substantially as set forth.

In testimony whereof I have signed this specification in the presence of two subscribing witnesses.

GEORGE H. MOORE.

Witnesses:
 GEORGE F. DOWNING,
 S. G. NOTTINGHAM.